US008688171B2

(12) United States Patent
Pan et al.

(10) Patent No.: US 8,688,171 B2
(45) Date of Patent: Apr. 1, 2014

(54) METHOD AND DEVICE FOR OPERATING TELEPHONE DIRECTORY

(75) Inventors: Chunling Pan, Guangdong Province (CN); Zongyang Wang, Guangdong Province (CN); Xinglin Niu, Guangdong Province (CN)

(73) Assignee: ZTE Corporation, Shenzhen, Guang Dong Province (CN)

( * ) Notice: Subject to any disclaimer, the term of this patent is extended or adjusted under 35 U.S.C. 154(b) by 0 days.

(21) Appl. No.: 13/257,735

(22) PCT Filed: Sep. 14, 2010

(86) PCT No.: PCT/CN2010/076878
§ 371 (c)(1),
(2), (4) Date: Mar. 16, 2012

(87) PCT Pub. No.: WO2011/032484
PCT Pub. Date: Mar. 24, 2011

(65) Prior Publication Data
US 2013/0065563 A1    Mar. 14, 2013

(30) Foreign Application Priority Data

Sep. 18, 2009  (CN) .......................... 2009 1 0176530

(51) Int. Cl.
*H04B 1/38* (2006.01)
(52) U.S. Cl.
USPC ..... 455/558; 455/557; 455/550.1; 455/556.2; 455/556.1; 455/414.1; 707/E17.001; 707/E17.044; 707/E17.038
(58) Field of Classification Search
USPC ................ 455/558, 557, 550.1, 556.2, 556.1, 455/414.1, 564; 707/E17.001, E17.044, 707/E17.038
See application file for complete search history.

(56) References Cited

U.S. PATENT DOCUMENTS

| | | | | |
|---|---|---|---|---|
| 6,012,634 A | * | 1/2000 | Brogan et al. | ................. 235/380 |
| 2004/0172391 A1 | * | 9/2004 | Josenhans | ......................... 707/3 |

(Continued)

FOREIGN PATENT DOCUMENTS

| CN | 1972334 A | 5/2007 |
|---|---|---|
| CN | 101068394 A | 11/2007 |

(Continued)

OTHER PUBLICATIONS

International Search Report for PCT/CN2010/076878 dated Nov. 29, 2010.

*Primary Examiner* — Khai M Nguyen
(74) *Attorney, Agent, or Firm* — Ling Wu; Stephen Yang; Lingand Yang Intellectual Property LLC

(57) ABSTRACT

The present invention discloses a method and device for operating telephone directories applied in a mobile terminal using a smart SIM card. The method comprising: after the mobile terminal is powered on, reading telephone directories in the mobile terminal and in the smart SIM card and constructing the first and second tables respectively; and when the mobile terminal detects that the first and second tables have been constructed, accomplishing a subscriber's operation on telephone directories in the first table and/or the second table, and after the first table is modified, using the modified first table to update the telephone directory in the mobile terminal, and after the second table is modified, using the modified second table to update the telephone directory in the smart SIM card. The device comprises a mobile terminal and a smart SIM card, wherein the mobile terminal comprises a processor, a storage, and a memory.

12 Claims, 2 Drawing Sheets

(56) References Cited

U.S. PATENT DOCUMENTS

| | | | |
|---|---|---|---|
| 2007/0060199 A1* | 3/2007 | Cheng | 455/558 |
| 2009/0138426 A1* | 5/2009 | Ishikawa | 707/1 |
| 2009/0247215 A1* | 10/2009 | Katsumata | 455/550.1 |
| 2010/0285787 A1* | 11/2010 | Matsuda | 455/418 |

FOREIGN PATENT DOCUMENTS

| | | |
|---|---|---|
| CN | 101426188 A | 5/2009 |
| CN | 101692746 A | 4/2010 |
| WO | WO 9830053 A1 * | 7/1998 |

* cited by examiner

US 8,688,171 B2

METHOD AND DEVICE FOR OPERATING TELEPHONE DIRECTORY

TECHNICAL FIELD

The present invention relates to mobile communication technologies, and more particularly, to a method and device for operating telephone directories.

BACKGROUND OF THE RELATED ART

With the increasing popularity of mobile terminals, subscribers are gradually more and more dependent on the mobile terminals. For example, a subscriber would like to store phone numbers required to be remembered as well as their related information into a telephone directory as much as possible, and hopes not to lose information due to replacement of his/her mobile terminal. However, because of constraints of a storage space and storage method in a traditional SIM (Subscriber Identity Module) card, the capacity of a telephone directory is limited, which is unable to meet requirements of the subscriber operating the telephone directory in the SIM card.

In recent years, since the subscribers' requirements on intellectualization and multimedia of SIM cards are increased, a SIM card supporting a SCWS (Smartcard Web Server) function (Smart SIM card) emerges. Such a SIM card may be regarded as a server for replacing the traditional SIM card that is widely used at present. As the smart SIM card has large capacity, it can store a relatively large number of phone numbers and their related information.

At present, in the case that a mobile terminal uses a smart SIM card, there are two methods for operating telephone directories based on the mobile terminal.

One method is to use different operating menus for a telephone directory in a storage of a mobile terminal and a telephone directory in a smart SIM card respectively, operate the telephone directory in the storage using a telephone directory menu of the mobile terminal, and send an APDU (Application protocol data unit) to the smart SIM card according to the ISO7816-4 specification using a STK (SIM Tool Kit) menu, so as to operate the telephone directory in the smart SIM card. However, the method of operating the telephone directory using different menus cannot meet the subscribers' requirements of operating the telephone directories both in the smart SIM card and in a storage space of the mobile terminal through a uniform menu.

The other method is to operate the telephone directory in the smart SIM card and the telephone directory in the mobile terminal through the existing same telephone directory menu. Since the storage location and format of the telephone directory in the smart SIM card are not the same as those in the traditional SIM card and do not conform to the format described in section 10.5.1 in the GSM 11.11 specification, although both the telephone directory in the smart SIM card and the telephone directory in the storage space of the mobile terminal can be operated through the existing same telephone directory menu, the subscriber can only operate the first 254 entries in the telephone directory in the smart SIM card and can not operate the last 1746 entries in the telephone directory, therefore, the last 1746 entries in the telephone directory have to be kept idle, resulting in the waste of telephone directory resources in the smart SIM card.

CONTENT OF THE INVENTION

A technical problem to be solved by the present invention is to provide a method and device for operating telephone directories so as to operate fast and conveniently telephone directories in both a smart SIM card and a mobile terminal.

In order to solve the aforementioned technical problem, the present invention provides a method for operating telephone directories applied in a mobile terminal using a smart subscriber identity module (SIM) card, the method comprising:

after the mobile terminal is powered on, reading a telephone directory in the mobile terminal and a telephone directory in the smart SIM card and constructing a first table and a second table respectively; and when the mobile terminal detects that the first table and the second table have been constructed, accomplishing a subscriber's operation on telephone directories in the first table and/or the second table, and after the first table is modified, using the modified first table to update the telephone directory in the mobile terminal, and after the second table is modified, using the modified second table to update the telephone directory in the smart SIM card.

The method might also comprise: when the mobile terminal detects that the first table has been constructed while the second table has not been constructed, if the subscriber chooses to operate the telephone directory in the smart SIM card, the mobile terminal accomplishing the subscriber's operation on the telephone directory in the smart SIM card.

The method might also comprise: after the first table has been constructed while the second table has not been constructed, if the telephone directory in the smart SIM card has been modified, the mobile terminal reading the modified telephone directory in the smart SIM card and re-constructing the second table.

The method might also comprise: after the mobile terminal is powered on and before the first table and the second table are constructed, the mobile terminal setting an update identifier of the telephone directory in the smart SIM card to indicate whether the telephone directory in the smart SIM card is modified;

the mobile terminal determining whether the telephone directory in the smart SIM card is modified according to the update identifier of the telephone directory in the smart SIM card, and if the telephone directory in the smart SIM card is modified, reading the modified telephone directory in the smart SIM card and re-constructing the second table.

In this method, the step of the mobile terminal accomplishing the subscriber's operation on the telephone directory in the smart SIM card comprises:

the mobile terminal accomplishing the subscriber's operation on the telephone directory in the smart SIM card by sending a Hypertext Transfer Protocol (HTTP) request to the smart SIM card; and if the mobile terminal searches the telephone directory in the smart SIM card via the HTTP request, the smart SIM card returning contents of the telephone directory in a format of Extensible Markup Language (XML) to the mobile terminal.

The method might also comprise: if the subscriber operates the telephone directory in the smart SIM card through a SIM Tool Kit (STK) menu and modifies the telephone directory in the smart SIM card, the mobile terminal reading the modified telephone directory in the smart SIM card and re-constructing the second table.

The method might also comprise: after the mobile terminal is powered on and before the first table and the second table are constructed, the mobile terminal further setting an initialization state identifier of the telephone directory in the smart SIM card and an initialization state identifier of the telephone directory in the mobile terminal, which are respectively used to indicate whether the first table and the second table have been constructed; and when the subscriber operates the telephone directory, the mobile terminal detecting whether the first table and the second table have been constructed according to the initialization state identifier of the telephone directory in the smart SIM card and the initialization state identifier of the telephone directory in the mobile terminal.

In the method, the mobile terminal constructing the second table comprises:

the mobile terminal determining whether the first table has been constructed, and if the first table has not been constructed, reading entries from the telephone directory in the smart SIM card to construct the second table; and after reading the entries, the mobile terminal determining whether all entries in the telephone directory in the smart SIM card have been read, if yes, setting the initialization state identifier of the telephone directory in the smart SIM card as a completed state; otherwise re-reading the telephone directory in the smart SIM card and constructing the second table.

In this method, the mobile terminal constructing the second table also comprises:

when the mobile terminal determines whether the first table has been constructed, if the first table has been constructed, determining whether the telephone directory in the smart SIM card is updated, if not, reading the entries from the telephone directory in the smart SIM card to construct the second table; if yes, re-reading the telephone directory in the smart SIM card and re-constructing the second table.

The present invention also provides a device for operating telephone directories comprising a mobile terminal and a smart SIM card, wherein the mobile terminal comprises a processor, a storage, and a memory; and wherein the smart SIM card is configured to store a telephone directory in the smart SIM card;

the storage is configured to store a telephone directory in the mobile terminal; and the processor is configured to, after the mobile terminal is powered on, read the telephone directory in the smart SIM card from the smart SIM card and the telephone directory in the mobile terminal from the memory respectively, and construct a first table and a second table in the memory; and when detecting that both the first table and the second table have been constructed, accomplish a subscriber's operation on telephone directories in the first table and/or the second table, and after the first table is modified, use the modified first table to update the telephone directory in the mobile terminal; after the second table is modified, use the modified second table to update the telephone directory in the smart SIM card.

In the device, the processor might also be configured to, when detecting that the first table has been constructed while the second table has not been constructed, if the subscriber chooses to operate the telephone directory in the smart SIM card, accomplish the subscriber's operation on the telephone directory in the smart SIM card.

In the device, the processor might also be configured to, when detecting that the first table has been constructed while the second table has not been constructed, if the telephone directory in the smart SIM card has been modified, read the modified telephone directory in the smart SIM card and re-construct the second table.

In summary, the present invention combines organically storing, deleting, and searching functions of the telephone directory in the smart SIM card with storing, deleting, and searching functions of the telephone directory in the mobile terminal to improve convenience of the subscriber's operation on the telephone directory in the event that the subscriber experience is guaranteed; meanwhile, the present invention is compatible with the operation on the telephone directory of the traditional SIM card, thereby meeting the subscriber's consistency and habituation requirements of operating the telephone directory in the smart SIM card and the telephone directory of the traditional SIM card.

PREFERRED EMBODIMENTS OF THE PRESENT INVENTION

Figure 1:
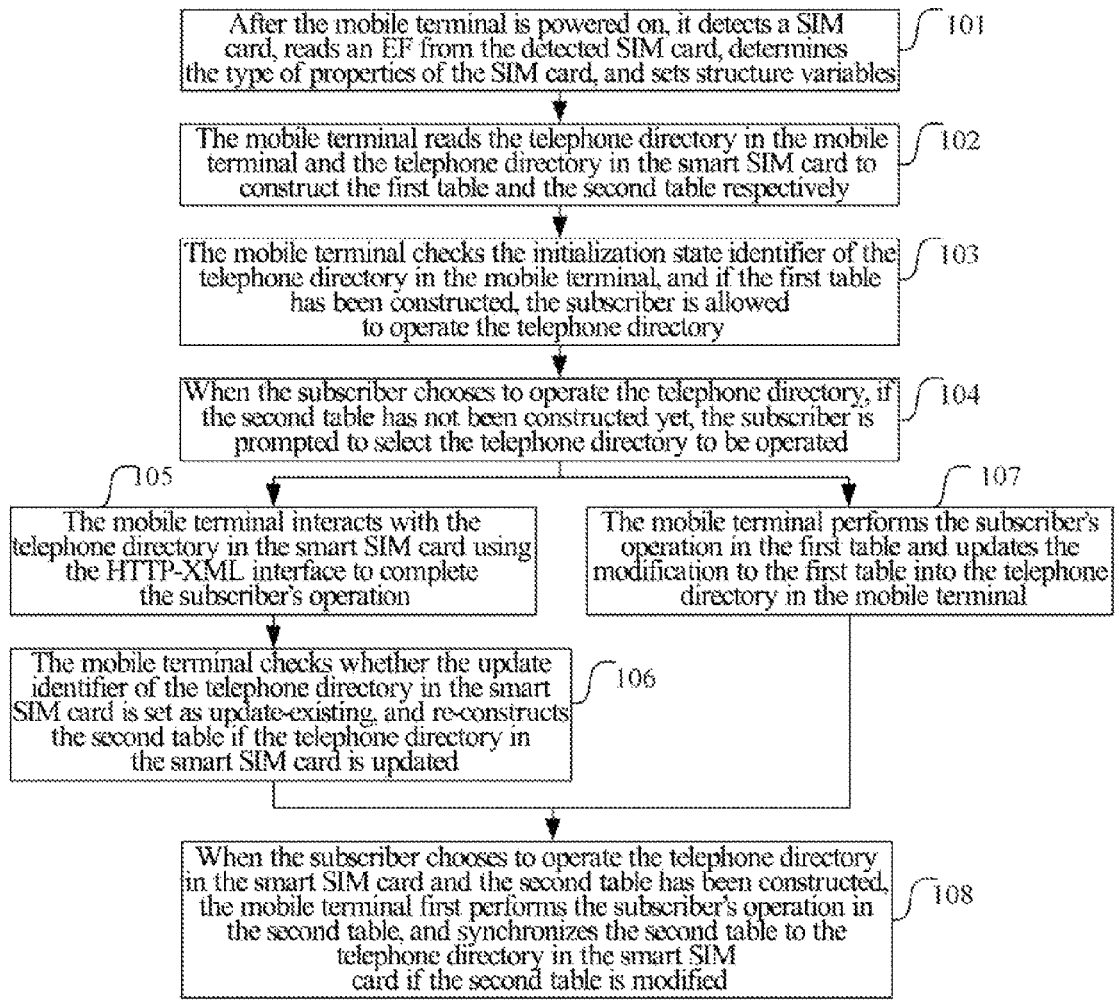
FIG. 1 is a flow chart of a procedure of operating telephone directories after a mobile terminal is powered on in accordance with the present invention.

After a mobile terminal is powered on, it detects a SIM card, reads an EF (Elementary File) from the detected SIM card, determines the type of the SIM card based on the EF, and if it is a smart SIM card, sets a related structure variable. A telephone directory stored in a storage of the mobile terminal (a telephone directory in the mobile terminal) is initialized and the first table is constructed.

Meanwhile, a telephone directory stored in the smart SIM card (a telephone directory in the smart SIM card) is initialized, that is, a name and the first phone number in the telephone directory in the smart SIM card are read via the HTTP (Hypertext Transfer Protocol)-XML (Extensible Markup Language) interface to construct the second table.

By constructing the first table and the second table, the mobile terminal might perform first a subscriber's operation in the first table and/or the second table and operate the telephone directory in the smart SIM card without directly entering into the smart SIM card, thus solving the defect that the last 1746 entries in the telephone directory in the smart SIM can not be operated using the existing telephone directory menu.

After the first table and the second table have been constructed, in retrieve and search operations of the subscriber, the mobile terminal can retrieve and search a phone number in the first table and the second table, and display the phone number to the subscriber after the retrieval is completed. In a deletion operation of the subscriber, after searching out the deleted phone number, the mobile terminal deletes the phone number from the first table or the second table, and updates the telephone directory in the mobile terminal or the telephone directory in the smart SIM card. In a adding operation of the subscriber, the mobile terminal might ask the subscriber to select to store the phone number into the telephone directory in the mobile terminal or the telephone directory in the smart SIM card, and store the phone number into the first table or the second table according to the subscriber's selection accordingly, and then update the telephone directory in the mobile terminal or the telephone directory in the smart SIM card. Of course, the mobile terminal might also store the phone number added by the subscriber into the telephone directory in the mobile terminal or the telephone directory in the smart SIM card by default without prompting the subscriber to perform the selection.

When neither the first table nor the second table has been constructed, the subscriber is prohibited from operating the telephone directories.

When the first table has been constructed while the second table has not been constructed, the subscriber is prompted to choose whether to operate the telephone directory in the mobile terminal or to operate the telephone directory in the smart SIM card. If the subscriber operates the telephone directory in the mobile terminal, the mobile terminal first performs the subscriber's operation in the first table, and then updates the modified first table into the memory; if the subscriber operates the telephone directory in the smart SIM card, the mobile terminal directly operates the telephone directory in the smart SIM card via the HTTP-XML interface. Since at this point the second table has not been initialized yet, after the telephone directory in the smart SIM card is modified, the second table is required to be re-constructed.

After both the first table and the second table have been constructed, during the subscriber's operation, the mobile terminal might operate first the first table and the second table first and synchronize the modification to the telephone directory in the mobile terminal or the telephone directory in the smart SIM card according to the operated tables.

The specific embodiments of the present invention will be described below in conjunction with the accompanying drawings.

FIG. 1 shows a procedure of operating telephone directories after a mobile terminal is powered on in accordance with the present invention comprising the following steps.

In step 101, after the mobile terminal is powered on, it detects a SIM card, reads an EF from the detected SIM card, determines the type and properties of the SIM card, and sets structure variables.

There are two types of SIM cards: a smart SIM card and a traditional SIM card. Their properties include the capacity of a telephone directory, etc.

The following structure variables are set to store information required in processing telephone directories:

```
typedef struct
{
    card_context_struct sim_card; // The type structure of the SIM card
    U16 sim_sews_total; // The capacity of the telephone directory in the smart SIM card
    U16 sim_sews_used; // The number of used telephone directories in the SIM card
    Kal bool sim_initial_state; // An initialization state identifier of the telephone directory in the smart SIM card
    Kal bool phone_initial_state; // An initialization state identifier of the telephone directory in the mobile terminal
    Kal bool sim_entry_change; // An update identifier of the telephone directory in the smart SIM card
} mmi_phb_context_struct;
typedef struct
{
    U8 sim_card_type; // A type identifier of the card, including the smart SIM card and the traditional SIM card
    U8 sim_card_interface; // The interface speed of the card
    U32 buffer; // The memory capacity of the card
} card_context_struct;
```

In step 102, the mobile terminal initializes the telephone directories, specifically, the mobile terminal reads the telephone directory in the mobile terminal and the telephone directory in the smart SIM card to construct the first table and the second table respectively, sets the initialization state identifier of the telephone directory in the mobile terminal as a completed state after the first table has been constructed, and sets the initialization state identifier of the telephone directory in the smart SIM card as a completed state after the second table has been constructed.

As there are many phone numbers in the telephone directory in the smart SIM card, in the present invention, to increase the power-on speed, the telephone directories in the mobile terminal's own storage are initialized separately to form a retrieval table (the first table).

After the first table has been constructed, the subscriber is allowed to operate the telephone directories. After the telephone directory in the smart SIM card is initialized in background, only a name and the first phone number in the telephone directory in the smart SIM card are extracted to construct another retrieval table (the second table).

In step 103, the mobile terminal checks the initialization state identifier of the telephone directory in the mobile terminal, and if the first table has been constructed, the subscriber is allowed to operate the telephone directory.

In step 104, when the subscriber chooses to operate the telephone directory, the mobile terminal checks the initialization state identifier of the telephone directory in the smart SIM card, if the second table has not been constructed yet, the subscriber is prompted to select the telephone directory to be operated, if the subscriber chooses to operate the telephone directory in the smart SIM card, step 105 is performed; if the subscriber chooses to operate the telephone directory in the storage, step 107 is performed.

In step 105, the mobile terminal interacts with the telephone directory in the smart SIM card using the HTTP-XML interface to complete the subscriber's operation.

The mobile terminal implements searching, adding, and deleting operations by sending an HTTP request to the smart SIM card. If the terminal requests to perform the searching operation, the smart SIM card returns contents of the telephone directory in a XML format to the mobile terminal.

When the mobile terminal searches the telephone directory in the smart SIM card, it acquires about 10 entries in the telephone directory upon every request and displays them to the subscriber, so as to guarantee the response speed acceptable by the subscriber.

In step 106, the mobile terminal checks whether the update identifier of the telephone directory in the smart SIM card is set as update-existing, and re-constructs the second table if the telephone directory in the smart SIM card is updated.

After the telephone directory in the smart SIM card is modified, the update identifier of the telephone directory in the smart SIM card will be set as the update-existing state.

In step 107, the mobile terminal performs the subscriber's operation in the first table and updates the modification to the first table into the telephone directory in the mobile terminal.

In step 108, when the subscriber chooses to operate the telephone directory in the smart SIM card and the mobile terminal detects that the initialization state identifier of the telephone directory in the smart SIM card indicates that the second table has been constructed, the mobile terminal first performs the subscriber's operation in the second table, and synchronizes the second table to the telephone directory in the smart SIM card if the second table is modified.

A retrieval mode, such as Chinese stroke retrieval mode, which has not existed in the HTTP-XML interface command, can be added by constructing the second table for the telephone directory in the smart SIM card and firstly operating the telephone directory in the second table.

After performing the deleting and adding operations on the telephone directory in the smart SIM card, mirror image data (the second table) of the telephone directory in the smart SIM card in the mobile terminal is required to be re-constructed. If the telephone directory in the smart SIM card has been modified after the subscriber performs operations related to the telephone directory in the smart SIM card through the STK menu, then the update identifier of the telephone directory in the smart SIM card is set as update-existing. After the terminal determines that the telephone directory in the smart SIM card is updated according to the identifier, it re-constructs the second table, and sets the update identifier of the telephone directory in the smart SIM card as non-update.

Figure 2:
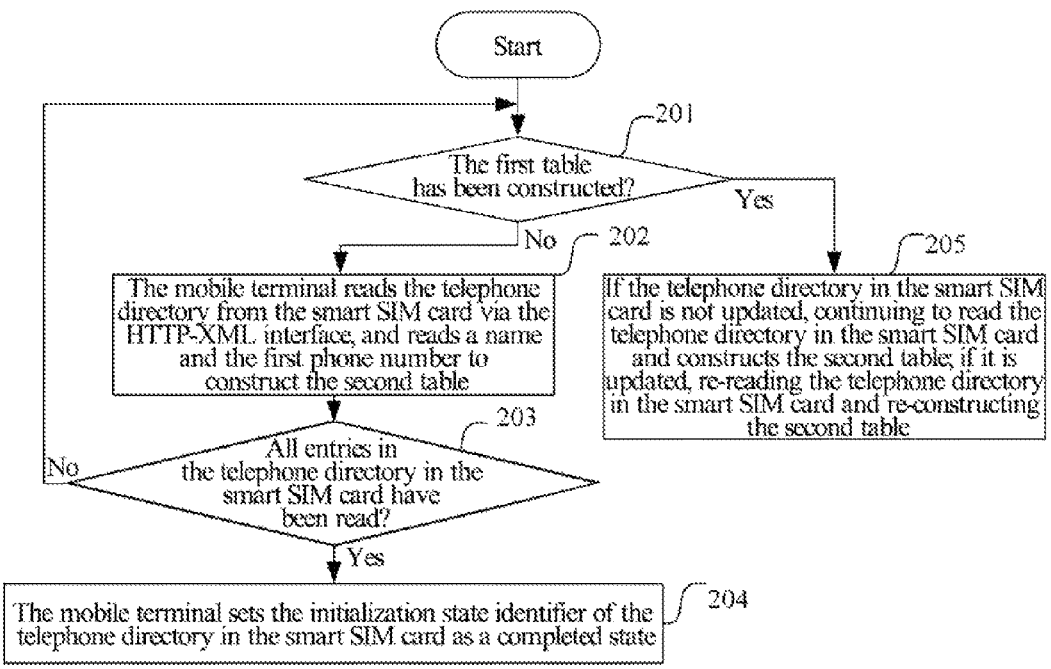
FIG. 2 is a flow chart of a procedure of constructing the second table in accordance with the present invention.

FIG. 2 shows a procedure of constructing the second table comprising the following steps.

In step 201, the mobile terminal determines whether the first table has been constructed, if the first table has not been constructed, step 202 is performed; if the first table has been constructed, step 205 is performed.

In step 202, the mobile terminal reads the telephone directory from the smart SIM card via the HTTP-XML interface, and reads a name and the first phone number to construct the second table.

Whenever the telephone directory is read, about ten entries may be read each time.

In step 203, the mobile terminal determines whether all entries in the telephone directory in the smart SIM card have been read, if yes, step 204 is performed; otherwise, step 201 is performed.

In step 204, the mobile terminal sets the initialization state identifier of the telephone directory in the smart SIM card as a completed state.

In step 205, the mobile terminal determines whether the telephone directory in the smart SIM card is updated, if it is not updated, continues to read the telephone directory in the smart SIM card and constructs the second table; if it is updated, re-reads the telephone directory in the smart SIM card and re-constructs the second table.

After the first table is constructed, the subscriber might operate the telephone directory in the smart SIM card. If the operation is successful, then the telephone directory in the smart SIM card is updated. After the telephone directory in the SIM card is updated, an update identifier of the telephone directory in the smart SIM card is set to indicate the update, and the mobile terminal determines whether the telephone directory is updated according to the identifier. If the telephone directory is updated, the telephone directory in the smart SIM card is required to be re-initialized, and the update identifier is set as non-update.

Figure 3:
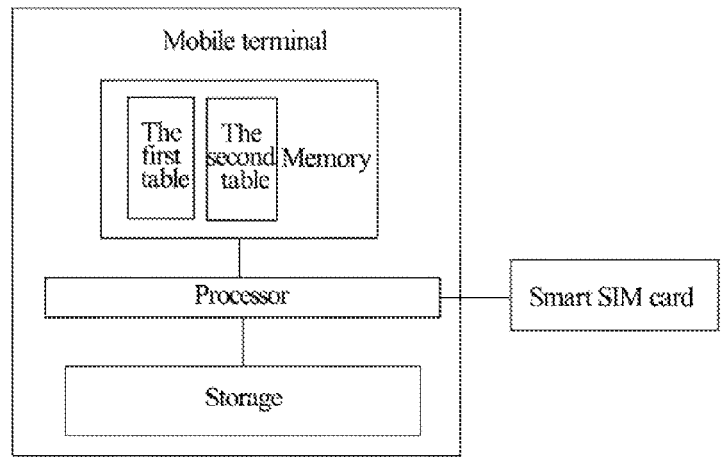
FIG. 3 is a block diagram of a device for operating telephone directories in accordance with the present invention.

FIG. 3 shows a device for operating telephone directories in accordance with the present invention comprising a mobile terminal and a smart SIM card, wherein the mobile terminal comprises a processor, a storage, and a memory.

The smart SIM card is configured to store a telephone directory in the smart SIM card.

The storage is configured to store a telephone directory in the mobile terminal.

The processor is configured to, after the mobile terminal is powered on, read the telephone directory in the smart SIM card from the smart SIM card and the telephone directory in the mobile terminal from the memory respectively, and construct a first table and a second table in the memory; and when detecting that both the first table and the second table have been constructed, accomplish a subscriber's operation on telephone directories in the first table and/or the second table, and after the first table is modified, use the modified first table to update the telephone directory in the mobile terminal; after the second table is modified, use the modified second table to update the telephone directory in the smart SIM card.

The processor is further configured to, when detecting that the first table has been constructed while the second table has not been constructed, if the subscriber chooses to operate the telephone directory in the smart SIM card, accomplish the subscriber's operation on the telephone directory in the smart SIM card; if the telephone directory in the smart SIM card has been modified, read the modified telephone directory in the smart SIM card and re-construct the second table.

The other functions of various portions in this device are described with reference to the description of the method.

The above description is only the preferred embodiments of the present invention and is not intended to limit the present invention. Various modifications and variations to the present invention may be made by those skilled in the art. Any modification, equivalent substitution and improvement made within the spirit and principle of the present invention should be covered in the protection scope of the present invention.

INDUSTRIAL APPLICABILITY

The present invention combines organically storing, deleting, and searching functions of the telephone directory in the smart SIM card with storing, deleting, and searching functions of the telephone directory in the mobile terminal to improve convenience of the subscriber's operation on the telephone directory in the event that the subscriber experience is guaranteed; meanwhile, the present invention is compatible with the operation on the telephone directory of the traditional SIM card, thereby meeting the subscriber's consistency and habituation requirements of operating the telephone directory in the smart SIM card and the telephone directory of the traditional SIM card.

What is claimed is:

1. A method for operating telephone directories applied in a mobile terminal using a smart subscriber identity module (SIM) card, the method comprising:
   after the mobile terminal is powered on, reading a telephone directory in the mobile terminal and a telephone directory in the smart SIM card, wherein the smart SIM card is a SIM card supporting a Smartcard Web Server function, and constructing a first table corresponding to the telephone directory in the mobile terminal and a second table corresponding to the telephone directory in the smart SIM card; and
   when the mobile terminal detects that the first table and the second table have been constructed, accomplishing a subscriber's operation on telephone directories in the first table and/or the second table, and after the first table is modified, using the modified first table to update the telephone directory in the mobile terminal, and after the second table is modified, using the modified second table to update the telephone directory in the smart SIM card.

2. The method according to claim 1, further comprising:
   when the mobile terminal detects that the first table has been constructed while the second table has not been constructed, when the subscriber chooses to operate the telephone directory in the smart SIM card, the mobile terminal accomplishing the subscriber's operation on the telephone directory in the smart SIM card.

3. The method according to claim 2, further comprising:
   after the first table has been constructed while the second table has not been constructed, when the telephone directory in the smart SIM card has been modified, the mobile terminal reading the modified telephone directory in the smart SIM card and re-constructing the second table.

4. The method according to claim 3, further comprising:
   after the mobile terminal is powered on and before the first table and the second table are constructed, the mobile terminal setting an update identifier of the telephone directory in the smart SIM card to indicate whether the telephone directory in the smart SIM card is modified; and the mobile terminal determining whether the telephone directory in the smart SIM card is modified according to the update identifier of the telephone directory in the smart SIM card, and when the telephone directory in the smart SIM card is modified, reading the modified telephone directory in the smart SIM card and re-constructing the second table.

5. The method according to claim 2, wherein the step of the mobile terminal accomplishing the subscriber's operation on the telephone directory in the smart SIM card comprises:
the mobile terminal accomplishing the subscriber's operation on the telephone directory in the smart SIM card by sending a Hypertext Transfer Protocol (HTTP) request to the smart SIM card; and
when the mobile terminal searches the telephone directory in the smart SIM card via the HTTP request, the smart SIM card returning contents of the telephone directory in a format of Extensible Markup Language (XML) to the mobile terminal.

6. The method according to claim 1, further comprising:
when the subscriber operates the telephone directory in the smart SIM card through a SIM Tool Kit (STK) menu and modifies the telephone directory in the smart SIM card, the mobile terminal reading the modified telephone directory in the smart SIM card and re-constructing the second table.

7. The method according to claim 1, further comprising:
after the mobile terminal is powered on and before the first table and the second table are constructed, the mobile terminal further setting an initialization state identifier of the telephone directory in the smart SIM card and an initialization state identifier of the telephone directory in the mobile terminal, which are respectively used to indicate whether the first table and the second table have been constructed; and
when the subscriber operates the telephone directory, the mobile terminal detecting whether the first table and the second table have been constructed according to the initialization state identifier of the telephone directory in the smart SIM card and the initialization state identifier of the telephone directory in the mobile terminal.

8. The method according to claim 7, wherein the mobile terminal constructing the second table comprises:
the mobile terminal determining whether the first table has been constructed, and when the first table has not been constructed, reading entries from the telephone directory in the smart SIM card to construct the second table; and
after reading the entries, the mobile terminal determining whether all entries in the telephone directory in the smart SIM card have been read, when all entries in the telephone directory in the smart SIM card have been read, setting the initialization state identifier of the telephone directory in the smart SIM card as a completed state; when all entries in the telephone directory in the smart SIM card have not been read, determining whether the first table has been constructed, and re-reading the telephone directory in the smart SIM card and constructing the second table when the first table has not been constructed.

9. The method according to claim 8, wherein the mobile terminal constructing the second table further comprises:
when the mobile terminal determines whether the first table has been constructed, when the first table has been constructed, determining whether the telephone directory in the smart SIM card is updated, when the telephone directory in the smart SIM card is not updated, continuing to read entries from the telephone directory in the smart SIM card to construct the second table; when the telephone directory in the smart SIM card is updated, re-reading the telephone directory in the smart SIM card and re-constructing the second table.

10. A device for operating telephone directories comprising a mobile terminal and a smart SIM card, wherein the mobile terminal comprises a processor, a storage, and a memory; and wherein
the smart SIM card is a SIM card supporting a Smartcard Web Server function, and is configured to store a telephone directory in the smart SIM card;
the storage is configured to store a telephone directory in the mobile terminal; and
the processor is configured to, after the mobile terminal is powered on, read the telephone directory in the smart SIM card from the smart SIM card and the telephone directory in the mobile terminal from the storage respectively, and construct in the memory a first table corresponding to the telephone directory in the mobile terminal and a second table corresponding to the telephone directory in the smart SIM card; and when detecting that both the first table and the second table have been constructed, accomplish a subscriber's operation on telephone directories in the first table and/or the second table, and after the first table is modified, use the modified first table to update the telephone directory in the mobile terminal; after the second table is modified, use the modified second table to update the telephone directory in the smart SIM card.

11. The device according to claim 10, wherein
the processor is further configured to, when detecting that the first table has been constructed while the second table has not been constructed, when the subscriber chooses to operate the telephone directory in the smart SIM card, accomplish the subscriber's operation on the telephone directory in the smart SIM card.

12. The device according to claim 11, wherein
the processor is further configured to, when detecting that the first table has been constructed while the second table has not been constructed, when the telephone directory in the smart SIM card has been modified, read the modified telephone directory in the smart SIM card and re-construct the second table.

* * * * *